Aug. 3, 1954  A. J. WILLIAMS, JR  2,685,676
VARIABLE-PHASE TRANSFER CIRCUIT
Filed Dec. 14, 1950  3 Sheets-Sheet 1

INVENTOR.
ALBERT J. WILLIAMS, JR.
BY
Woodcock and Phelan
ATTORNEYS

Aug. 3, 1954     A. J. WILLIAMS, JR     2,685,676
VARIABLE-PHASE TRANSFER CIRCUIT

Filed Dec. 14, 1950     3 Sheets-Sheet 2

*INVENTOR.*
ALBERT J. WILLIAMS, JR.
BY
Woodcock and Phelan
ATTORNEYS

Aug. 3, 1954  A. J. WILLIAMS, JR  2,685,676
VARIABLE-PHASE TRANSFER CIRCUIT
Filed Dec. 14, 1950  3 Sheets-Sheet 3
Fig. 5A
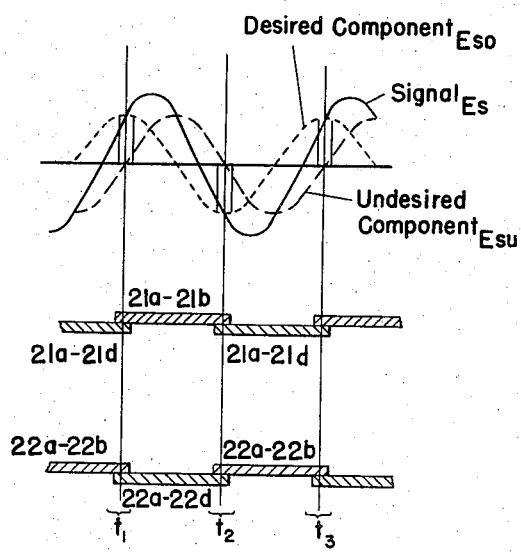
Fig. 5B
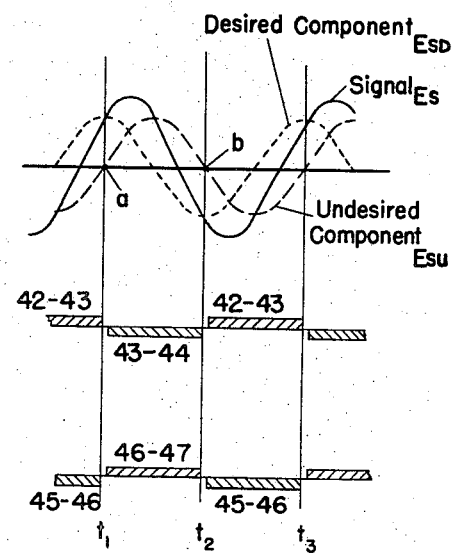
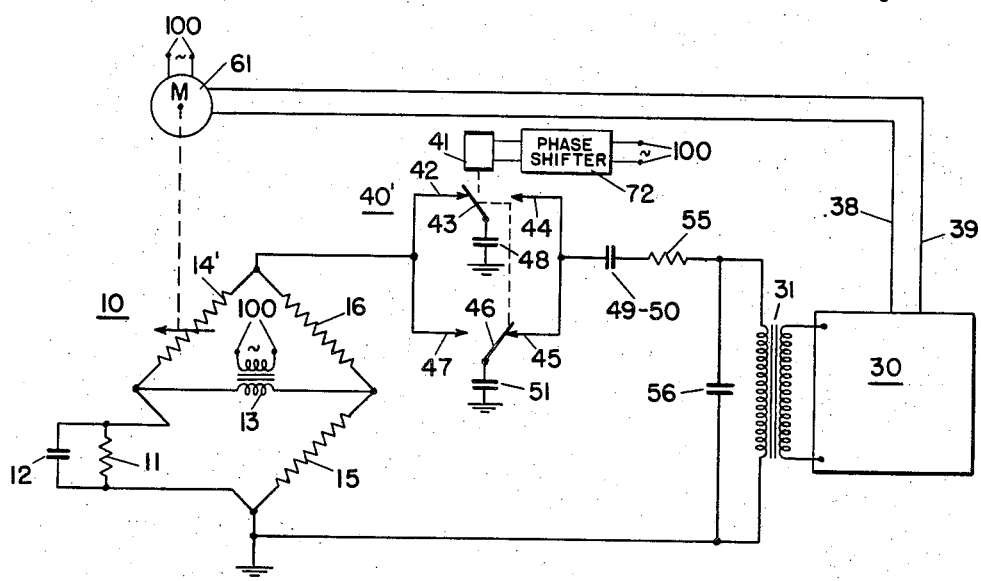
Fig. 6
INVENTOR.
ALBERT J. WILLIAMS, JR.
BY
Woodcock and Phelan
ATTORNEYS

Patented Aug. 3, 1954

2,685,676

UNITED STATES PATENT OFFICE 2,685,676

VARIABLE-PHASE TRANSFER CIRCUIT

Albert J. Williams, Jr., Philadelphia, Pa., assignor to Leeds and Northrup Company, Philadelphia, Pa., a corporation of Pennsylvania Application December 14, 1950, Serial No. 200,791

18 Claims. (Cl. 324—99)

This invention relates to electrical measuring systems of types utilizing alternating-current networks, and particularly relates to self-balancing measuring systems suited for indicating, recording or controlling variations in temperature, ion-concentration, or other condition under measurement.

In such systems, the output signal from the balanceable network has both in-phase and quadrature components relative to a reference voltage whose phase is prescribed by the quantity to be measured. Heretofore, when a true balance was sought for either the in-phase or quadrature component, the residual unbalance signal produced by the other component masked the null measurement of the desired component, making the determination of a true balance inaccurate.

In accordance with one aspect of the present invention, the alternating-current output signal is periodically sampled for short intervals centered around the successive nulls of the undesired component to reduce to negligible amount its effect upon the detector responsive to unbalance of the network. More specifically, in the signal transmission channel between the network and the detector there is interposed a synchronous inverter-converter timed to sample the signal when the undesired component is of negligible magnitude and to transmit to the detector an alternating-current signal representative of the desired component so to provide for accurate and rapid rebalancing adjustment of the balanceable network. In all embodiments, the inverter-converter provides the only path for transmission of signals to the detector.

Further in accordance with the present invention, changes in the amplitude of the transmitted alternating-current signal are applied to a measuring device in a proportion greater than the steady-state voltage-division ratio of the network so to anticipate the effect of the change and thereby to minimize overshoot of the balancing adjustment of said network. Such damping becomes necessary for high-speed self-rebalancing measuring systems such as often required for example in multipoint recorders.

More specifically in accordance with the present invention, there are provided in circuits which include the balanceable network and the sensitive measuring means, a transfer structure including contacts operating in fixed phase relation with the alternating-current input to the balanceable network, a two-branch resistor-capacitor network, and capacitors alternately connected by the aforesaid contacts periodically to sample the network output voltage and periodically to apply the sampled voltage to respective branches of the resistor-capacitor network, whereby a voltage representative of the desired component of the network output voltage is transferred and changes therein are enhanced in their application to the measuring means.

For a more detailed explanation of the invention and for further objects and advantages thereof, reference is to be had to the following detailed description taken in conjunction with the accompanying drawings, in which.

Figure 3:
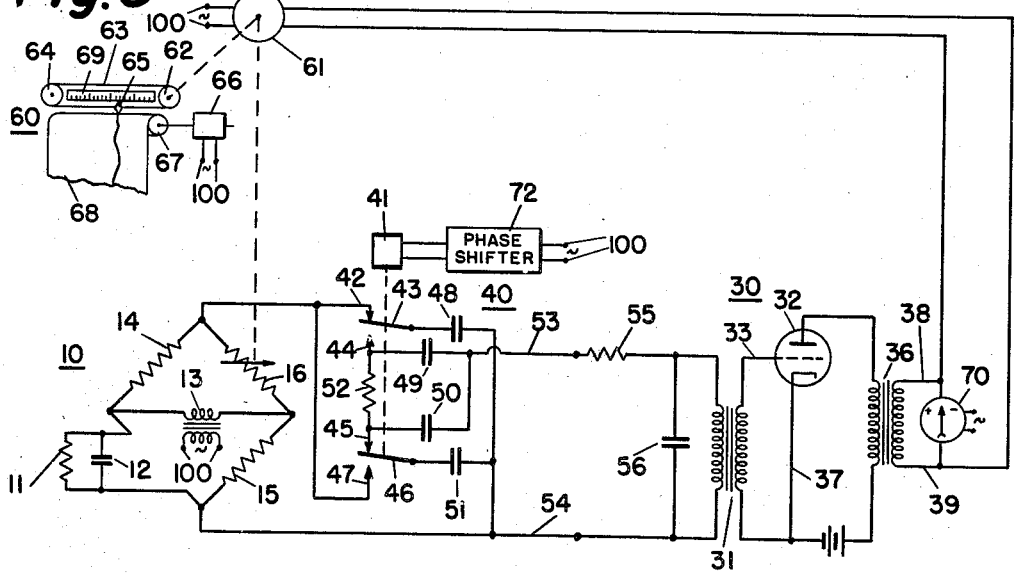
Figure 4:
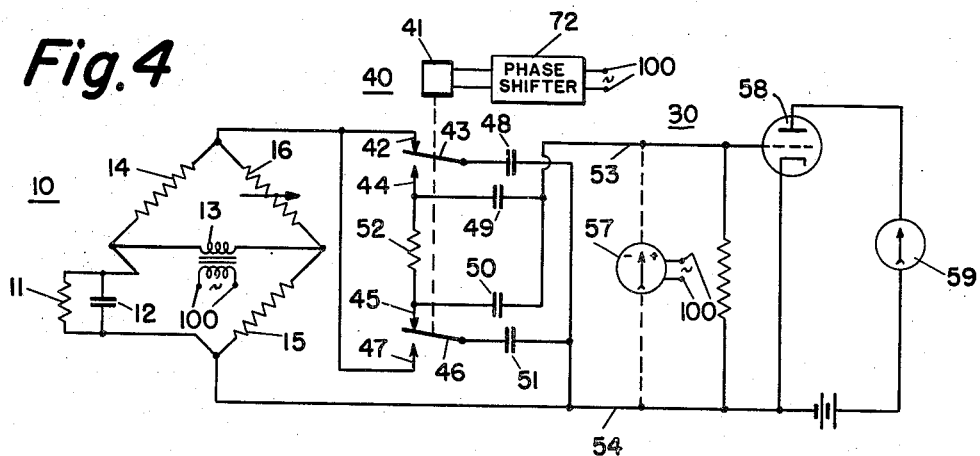

Fig. 3 schematically illustrates a third, self-balancing circuit embodying the invention;

Fig. 4 schematically illustrates another circuit embodying the invention with typical indicating or measuring means;

Figs. 5A and 5B are explanatory figures illustrative of the output voltage from a balanceable network, its in-phase and quadrature components, and the relation of sampling periods thereto; and Fig. 6 schematically illustrates a modification of the embodiment of Fig. 3.

Figure 1:
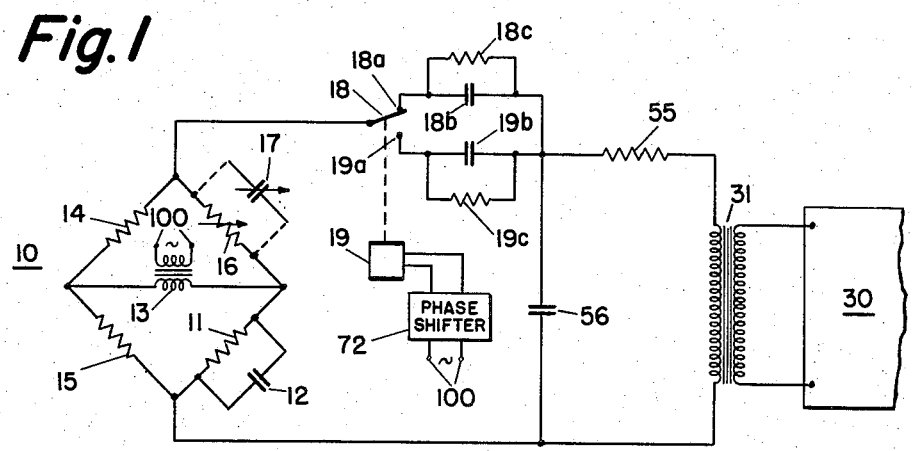
Fig. 1 is a schematic illustration of an embodiment of the invention.

Referring to Fig. 1 the balanceable bridge network 10 is energized from a suitable alternating current source such as transformer 13, supplied from power line 100. The condition-responsive device of network 10 as used for temperature measurements is a resistor 11 having a substantial temperature coefficient of resistance and suited for use as a resistance thermometer. This resistor is shunted by cable and circuit capacity 12 which modifies the desired resistive balance. Balance for minimum output obtains when resistor 16 is adjusted so that the impedance of resistor 11 in parallel with capacitor 12 and the value of resistor 16 have the same scalar ratio as resistors 15 and 14. However, a residual unbalance signal remains in the output, due to the phase angle of the current through capacitor 12, which introduces a quadrature component in the network's currents and voltages in addition to the desired in-phase component.

A true balance with substantially zero output can be achieved by providing a balance of reactive elements as well as a balance of resistive elements. In accord with prior practice, a variable capacitor 17 may be connected across resistor 16 and adjusted, in addition to adjustment of resistor 16, until a true balance of resistive and reactive elements is achieved. At best, however, such prior method is a time-consuming succession of interlocking adjustments of resistor 16 and then of capacitor 17 which mathematically would amount to a converging-series approximation of the true balance. Such method is unsuited for recording or controlling the variations in magnitude of temperature or other condition.

The present invention provides a means for minimizing the effect of reactances, intentionally or unavoidably present, upon the resistive balance of the bridge, or, alternatively, for minimizing the in-phase component when a reactive balance is desired. When both resistive and reactive balances are needed to obtain the desired measurement information, the present invention, as will hereinafter appear, reduces the succession of interlocking adjustments of resistor 16 and capacitor 17 to a precise, non-interlocking, two-step adjustment; a resistive balance while the quadrature component of the output voltage is minimized, and a reactive balance while the in-phase component of the output voltage is minimized.

The transfer circuit shown in Fig. 1 comprises a vibrating contactor 18 driven in fixed phase relation with the alternating line voltage 100 by actuator 19. Contactor 18 dwells on contact 18a for a small fraction of a half-cycle, allowing capacitor 18b to receive a charge from the network; and dwells on contact 19a for a similar small fraction of the next half cycle, allowing capacitor 19b to receive an opposite charge from the network. After repeated switching as described, capacitors 18b and 19b will become charged with direct voltages representative of the amplitude of respective alternate half-cycles of the bridge network's output at particular points of these alternate half-cycles.

By adjustment of the times at which actuator 19 closes contactor 18 with contact 18a and with contact 19a, the bridge network's output voltage can be sampled when the desired component is at or near full value in each half-cycle and when the undesired component is crossing the zero axis of alternating voltage.

Resistor 18c shunts capacitor 18b to provide a slight discharge in the intervals between contacts with contactor 18 to prevent, under a steady state condition of unbalance of network 10, or equivalent, blocking of transmission of the desired signal component by an equal voltage on the capacitor 18b. In this manner, capacitor 18b cannot charge up to the value of a steady unbalance signal. On each contact, some charging current must flow through transformer 31 and into capacitor 18b to replace the charge lost in resistor 18c. This current develops a signal in transformer 31 for a measuring system 30, not in detail shown in Fig. 1. The value of resistor 18c is such as to give a useful fraction of the bridge's output voltage as a signal to transformer 31. Similarly, resistor 19c shunts capacitor 19b, to provide some discharge thereof, to prevent blocking on a steady unbalance signal and to provide a useful fraction of the bridge's output voltage on the transformer 31. For rapid changes in the amplitude of the network's output voltage, these resistors 18c and 19c cannot as rapidly reduce the charges on capacitors 18b and 19b, so large charging or discharging currents will flow during successive closures of contacts 18, 18a and 18, 19a until the capacitor voltages approach the new network output voltage. In other words, the capacitor voltages are lowered by resistors 18c and 19c at a low rate, so that most of any rapid drop in the voltage applied across the capacitors 18b and 19b and transformer 31 must appear across transformer 31. In this embodiment of the invention, as well as the others subsequently described, there is no path for transmission of the undesired signal component $E_{su}$.

Figure 2:
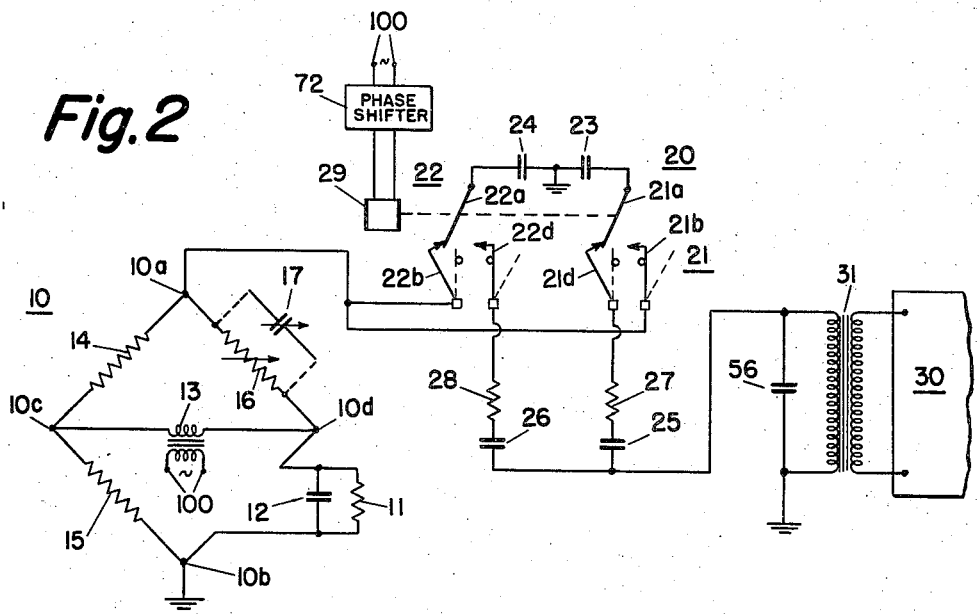
Fig. 2 is a schematic illustration of a second embodiment of the invention.

Transfer circuit 20 of Fig. 2 is another arrangement for selecting the desired component $E_{sd}$ (Fig. 5A) and for minimizing the undesired component $E_{su}$ of the bridge output voltage $E_s$. Switches 21 and 22, of the "make before break" type, are driven by actuator 29 in fixed phase relation with the alternating-current line voltage 100; all contacts of switch 21 being closed for a very short period of each half-cycle, and all contacts of switch 22 being closed for a similar period of each half-cycle. These short closed periods are spaced apart in time a half-cycle of line voltage 100. In successive intervals between these closed periods, the movable contact 21a of switch 21 dwells first upon contact 21d connected to the measuring circuit and then dwells upon contact 21b connected to the bridge output, while the movable contact 22a of switch 22 dwells first upon contact 22b connected to the bridge output and then dwells upon contact 22d connected to the measuring instrument in the same respective half-cycles. This closure time for various contacts is graphically shown in Fig. 5A. Synchronous actuator 29 can be shifted in phase to move the closed-contact or output-sampling period to be centered around successive nulls of the undesired component: for that purpose a phase-shifting network 72 may be interposed between source 100 and either the bridge 10 or the actuator 29. The movable contact member 21a of switch 21 is connected to capacitor 23, the movable contact member 22a of switch 22 is connected to capacitor 24, and capacitors 23 and 24 are connected to the low side or ground of the transmission channel. One fixed contact member 21d of switch 21 connects to resistor 27 and capacitor 25 in series circuit, one fixed contact 22d of switch 22 connects to resistor 28 and capacitor 26, and the other fixed contacts 21b, 22b respectively of switches 21 and 22 are connected in common to the output terminal 10a of bridge network 10. Capacitors 25 and 26 are connected, as through input transformer 31, to an indicating, balancing or recording instrument 30, not in detail shown in Fig. 2.

As successive half-waves are sampled by switches 21 and 22, direct-current voltages are left on capacitors 23 and 24 and built up on capacitors 25 and 26, the magnitude of these direct-current voltages being dependent upon the amplitude of alternating-current signal voltage. As the switches 21 and 22 are of the "make before break" type, the bridge output circuit, the shunt capacitors 23 and 24, and the two resistor-capacitor branches comprising resistors 27 and 28 and capacitors 25 and 26 are interconnected for a brief instant in each half-cycle; after which one switch is connected to the bridge and other switch is connected to its respective resistor-capacitor branch. A half-cycle later, another interconnection occurs and the switches reverse their connections: the one formerly on the bridge output now connects to its respective resistor-capacitor branch and the other switch now connects to the bridge output.

In Fig. 5A, the closure times for various contacts of switches 21 and 22 are shown. Starting in the position shown in Fig. 2, contact 21a is closed with contact 21d and contact 22a is closed with contact 22b. These connections are maintained until the movable contacts return to a central position, when contact 21a also closes with contact 21b for a short period before opening from contact 21d, and contact 22a closes with contact 22d for a short time before opening from contact 22b. This short interconnection period is shown as period $t_1$.

Contact 21a then remains connected to contact 21b for substantially a half-cycle, during which period the voltage on capacitor 23 follows the wave of the output voltage. At period $t_2$, another interconnection occurs. Some undesired discharge does occur between capacitors 23 and 24 during this period $t_2$, but a residual charge and voltage representative of the bridge output voltage at $t_2$ remains on capacitor 23 and is transferred to the measuring instrument 30 between periods $t_2$ and $t_3$.

During the interval, from $t_1$ to $t_2$, contact 22a remains connected to contact 22d and to its resistor-capacitor branch, resistor 28 and capacitor 26, sharing the charge of capacitor 24 with capacitor 26. The current of this sharing of charges flows through transformer 31 and impresses a signal on measuring instrument 30. At period $t_2$, another interconnection occurs, after which contact 22a is connected to contact 22b and to the bridge output for substantially a half-cycle. During this half-cycle, the voltage across capacitor 24 follows the output voltage from the bridge. At period $t_3$, another interconnection occurs and much of the charge on capacitor 24 is lost, but a residual charge and voltage representative of the bridge output voltage at $t_3$ remains on capacitor 24 and is transferred to the measuring instrument 30 when capacitors 24 and 26 share charges through transformer 31.

It will be observed that contact 21a dwells on contact 21d after alternate periods $t_2$, $t_4$, $t_6$, etc.; while contact 22a dwells on contact 22d after the intervening periods $t_1$, $t_3$, $t_5$, etc. This synchronous sampling of the bridge output voltage at successive nulls of the undesired component builds up voltages on capacitors 25 and 26 respectively representative of successive half-waves of the desired component of the bridge output voltage.

While the interconnection which occurs with the "make before break" type of switch produces some undesirable discharging of capacitors 23 and 24 and of capacitors 25 and 26, this effect is reduced by the comparatively low impedance of the bridge. Resistors 27 and 28 also aid by limiting the discharge from capacitors 25 and 26. Further, capacitors 23 and 24 are partly discharged while connected to their respective resistor-capacitor networks and to the measuring instrument, so that when they are momentarily interconnected to each other the capacitor coming from the bridge has the preponderance of charge: such partial discharge also prevents blocking of transmission of the desired signal component under steady state condition of unbalance of network 10. In tests, the residual voltage transferred to the measuring circuit gave suppression of the undesired component by factors of ten (10) to twelve (12) times, despite the losses during interconnection and the length of intervals $t_1$, $t_2$.

When there occurs a rapid change in the desired voltage component, as upon change of the measured variable or during rebalancing of network 10, the voltage of capacitors 25 and 26 cannot change rapidly because of series resistors 27 and 28.

The voltage division between the capacitors 25—26 and the input transformer 31 for a change in applied voltage depends upon whether the rate of change is greater or less than the capacitor discharge rate through resistors 27 and 28. If the decreasing voltage change rate is less than the capacitor discharge rate, then the signal applied to transformer 31 will be somewhat reduced but will continue to indicate the unbalance. If the rate of voltage decrease is the same as the capacitor discharge rate, then the signal applied to transformer 31 will disappear, giving a temporary false balance indication. If the rate of voltage decrease is greater than the capacitor discharge rate, then an unbalance signal of opposite polarity will be applied to transformer 31, giving a temporary false unbalance indication and providing braking action when the network 10 is automatically rebalanced in response to the transmitted signal component. Thus, the capacitors 25 and 26 and resistors 27 and 28 must be selected to provide capacitor discharge rates suitable for use in particular measurement and control systems. This enhanced transfer of the desired signal component during approach to the balance point amounts to anticipation of the null-point balance, thus tending to prevent overshoot as the balance actually is reached.

Although transfer circuit 20 of Fig. 2 affords suppression of the undesired component by factors of ten (10) to twelve (12) times, the short period of interconnection, when contacts 21a, 21b, 21d, 22a, 22b and 22d all are in a common connection, limits the amount of useful energy transferred to the measuring means 30, and causes excessive losses of the useful signal.

With the arrangement shown in Fig. 3, the losses imposed by a definite period of interconnection at the time of sampling are removed, and the sampling time is made a well defined point in each half-cycle, shown in Fig. 5B as times $t_1$, $t_2$, $t_3$, etc. The synchronous sampling-transfer switches of Fig. 3 are of the "break before make" type and, hence, the sampling time is essentially the time required to break movable contact 43 from contact 42 or to break movable contact 46 from contact 47. When these breaks are made in successive half-cycles, there is no period wherein all the contacts are interconnected, so the voltage of the bridge output which is impressed upon capacitor 48 or 51 at the time of break is transferred to the resistor-capacitor network and to the measuring means 30 without loss due to mutual discharge as occurred in Fig. 2.

Starting in the illustrated position of Fig. 3, contact 43 is broken away from contact 42 at the point where the undesired component $E_{su}$ of the bridge output voltage $E_s$ is at zero. This point is indicated as $t_1$ in Fig. 5B. Capacitor 48 when connected to contact 42 was charged to the voltage of the output wave at point $t_1$. Actuator 41 then moves contact 43 to close with contact 44, sharing the charge on capacitor 48 with capacitor 49. Any exchange of charge between capacitors 48 and 49 produces a current flow through transformer 31 and impresses a signal on detector circuit 30 which may, as shown, include a vacuum tube amplifier. At a time one half-cycle away from break-point $t_1$, contact 43 breaks from contact 44 and shortly thereafter closes with contact 42.

Starting again from the illustrated position of Fig. 3, contact 46 is broken from contact 45 at the time indicated by point $t_1$, Fig. 5B, and shortly thereafter closes with contact 47 at the same time contact 43 closes with contact 44. Capacitor 51 connnected to contact 46 is thus charged to the bridge output voltage and follows that voltage wave until point $t_2$ of Fig. 5B is reached, where the undesired component it at its next zero point. Then contact 46 is broken from contact 47 at the time indicated by point $t_2$, Fig. 5B, and then is closed with contact 45, sharing the charge on capacitor 51 with capacitor 50. Any exchange of charge between capacitors 50 and 51 produces a flow of current through transformer 31 and so impresses a signal on detector circuit 30. At point $t_3$ in the output voltage wave, contact 46 breaks from contact 45 and shortly thereafter closes with contact 47.

As the time required for breaking contact between capacitor 48 or 51 and the bridge is very short (the time required for low-potential low-current contacts to break being less than one microsecond), the voltages on these capacitors accurately correspond with the bridge output voltage at particular instants $t_1$, $t_2$, etc. Also, the energy which can be extracted from the bridge and successfully transferred to the detecting and balancing circuits 30 and 60 is greater than for transfer circuit 20 of Fig. 2. This is because there is no interconnection of all contacts with the resulting loss of charge. Further, contact 43 is closed with contact 42 for a large portion of a half-cycle of the output voltage and breaks therefrom only at the instant for sampling, and contact 46 is closed with contact 47 for a similar portion of the next half-cycle and breaks therefrom only at the sampling point in the next half-cycle.

In the intervals between closures on contact 42, contact 43 is closed with contact 44 and transfers through capacitor 49 to transformer 31 a signal representative of a particular point in alternate half-cycles of the desired component of the bridge output voltage ($t_1$, $t_3$, $t_5$, etc. of Fig. 5B). Similarly, in the intervals between closures on contact 47 when capacitor 51 is following the output voltage wave, contact 46 is closed with contact 45 and transfers through capacitor 50 to transformer 31 a signal representative of another particular point in intervening half-cycles of the desired component ($t_2$, $t_4$, etc. of Fig. 5B). In this manner, capacitors 49 and 50 acquire charges representative of opposite half-cycles of the desired voltage.

Resistor 52 is connected between capacitors 49 and 50 to provide a small current leakage therebetween. This leakage causes the voltage on capacitors 49 and 50 to remain slightly lower than the peak voltage of the desired component, in steady-state condition of bridge unbalance, requiring a small charging current every time contact 43 touches contact 44 and contact 46 touches contact 45, in successive half-cycles. These currents impress a small signal on transformer 31. In this way, the signal due to a persistent bridge unbalance of steady amplitude is not "blocked out" by the potential built upon capacitors 49 and 50 by the synchronous-contact-rectifier action of contacts 43 and 46, converting the alternating-current signal to direct current and then inverting that direct-current signal back to the alternating-current signal again.

The capacitor discharge rate determined by the circuit of resistor 52 and capacitors 49 and 50 will produce varied responses to various rates of change in the amplitude of an unbalance signal from bridge network 10. If the discharge rate is greater than the rate at which the signal voltage decreases, the unbalance signal will be applied to transformer 31 considerably reduced, thus enhancing the indication provided by the decreasing unbalance signals. If the discharge rate is equal to the voltage change rate, the signal applied to transformer 31 will be reduced to near zero, indicating a temporary or transitory false balance. If the discharge rate is less than the voltage change rate, the voltage change will cause large charging currents and large signals in transformer 31 indicative of a reverse temporary unbalance, and providing braking action. Thus, response to a decrease in an unbalance signal can be enhanced or "anticipated" by proper selection of circuit constants.

If the signal-voltage change is an increase in the applied voltage, the decay in voltages caused by resistor 52 shunting capacitors 49 and 50 will cause an even greater voltage difference between capacitors 48 and 49 and between capacitors 50 and 51; which, upon respective closures of contacts 43 and 44 and of contacts 45 and 46, will cause an increase in the signal applied to the measuring system 30, regardless of the relation between the voltage decay rate of resistor 52 and capacitors 49 and 50 and the rate of increase in the unbalance voltage. In general, capacitors 49 and 50 will present a low impedance to voltage changes and will pass changes in the applied voltage to the measuring system, while the value of resistor 52 determines what portion of a steady unbalance signal is transferred to the measuring system.

Resistor 55 and capacitor 56 are for shaping the wave produced by transfer circuit 40.

In the particular self-balancing recorder system shown in Fig. 3, input transformer 31 drives grid 33 of vacuum tube 32 with the desired signal component derived by the converter-inverter action of transfer circuit 40 from the output of the measuring bridge 10 or an equivalent balanceable measuring network. The output of the amplifier as exemplified by tube 32 is applied to balancing motor 61, which may be of the two-phase type, through output transformer 36 and conductors 38 and 39. The phase relation of the applied signal voltage relative to power line voltage 100 will cause operation of balancing motor 61 in proper direction to adjust resistor 16 for restoration of a balanced condition in bridge 10.

In addition to adjusting resistor 16 for balancing the bridge, the motor 61 adjusts a recorder pen or equivalent so that its position corresponds with the magnitude of the measured variable, specifically the temperature-sensitive resistor 11 of network 10. As shown, the motor 61 drives pulley or wheel 62, which in turn drives a loop 63 guided by idler pulley 64. The flexible cord or wire 63 actuates the pen and indicator 65 with respect to scale 69 and chart 68, the pen 65 leaving a trace of the varying magnitude of the measured condition on chart 68 as the latter is moved by roll 67 and a constant speed motor 66. Motor 66 may be an electric motor driven synchronously from power line voltage 100. Other motor-driven self-balancing recorders may, of course, be used. The point here significant is that the self-balancing system rapidly follows that component of the output of network 10 which gives a sharp null and does so in a way which tends to avoid overshootings, both objects being attained by the sampling-transfer network 40.

To described how transfer circuit 40 may be adjusted to minimize sampling of the undesired component of the output of network 10, assume that the ohmic value of resistor 11 is to be measured. Assume further that the ohmic equivalent to resistor 11 is connected in the bridge circuit, as shown in Fig. 3, but that capacitor 12 is not connected; and, that the bridge 10 is balanced and that balancing device 60 is inactivated. Actuator 41 is driving contacts 43 and 46, but their sampling times are not yet adjusted to the desired points in each cycle of voltage 100. Now a small capacitor 12 is connected in parallel with resistor 11 resulting in some bridge output. As this is not representative of change in the ohmic resistance of resistor 12, this component of the bridge output is the undesired or quadrature component. The output voltage before and after addition of capacitor 12 can be measured by any convenient method, such as by an alternating-current voltmeter 70 across conductors 38 and 39. The phase of the actuator 41 is now adjusted by phase-shifter 72 to a value which reduces this indication of the quadrature component of the output voltage to minimum value. Adjustment of phase-shifter 72 shifts the time of sampling by contacts 43 and 46 to various periods in their respective half-cycles of the output voltage. This shifting of the time of sampling can be provided by various well-known phase-shifters, indicated diagrammatically as phase-shifter 72. It will be readily understood that the phase-shifter 72 could be applied to the bridge input transformer 13 to cause the desired phase adjustment, rather than being applied to actuator 41 as shown. When the sampling of the output is adjusted to occur at or near the successive nulls of the undesired component, the conditions shown in Fig. 5B exist, and the sampled voltage as transferred to the detector 39 will represent the peak value of the desired component.

The invention is useful for measuring circuits which are not self-balancing and in which an unknown impedance has fixed or variable resistance and reactance, one or both of which is to be independently measured. For example, in Fig. 4, bridge 10 and transfer circuit 40 are utilized as previously described, and the sampled output voltage is applied to phase-sensitive indicator 57 or to a vacuum tube-amplifier 58 which feeds a highly amplified signal to vacuum-tube voltmeter 59.

When indicator 57 is utilized, sensitive indication of the in-phase component is substantially enhanced by minimizing the quadrature component. While a two-phase or watt-meter type indicator is comparatively insensitive to quadrature component voltage or to "wattless" current, such a quadrature component can cause errors due to small physical errors in the windings of the indicator and does vibrate the moving element. The present invention reduces these errors to a negligible value by reducing sampling time practically to a single point in each half-cycle and by phasing this sampling point to occur at successive nulls of the quadrature component.

When amplifier 58 and vacuum-tube-voltmeter 59 are utilized, either the in-phase or the quadrature component can be measured to the exclusion of the other by adjusting the phase-shifter 72 for actuator 41 to cause contacts 43 and 46 to sample the output voltage at successive zeroes of the undesired component. Amplifier 58 amplifies this sampled, desired component and feeds it to vacuum-tube voltmeter 59. If directly coupled to the bridge network 10, voltmeter 59 will indicate the resultant combination of in-phase and quadrature voltages present in the sampled voltage, and the balance setting of the bridge is not indicative of the magnitude of either the resistive or reactive component of the impedance being measured. Further, amplifier 58 usually is a very sensitive alternating-current amplifier capable of giving useful output signals as the desired component of the bridge output approaches zero in the null measurement. If the undesired or quadrature component is at a relatively high level when this adjustment is made, it will overload and saturate the amplifier and indicator or vacuum-tube voltmeter and block response to the desired signal, unless suppressed as above described for this invention. These overloads have been measured as several thousands per cent of minimum signal. The present invention provides an amplifier input signal which is substantially free of such undesired component, so avoiding saturation and insuring that the balance setting of the bridge is indicative of the resistance or reactance of the unknown, depending upon which has been selected by phasing of the sampling-transfer device.

As illustrated in Fig. 6, the embodiment of Fig. 3 may be utilized for the phased selection of a desired component of the output from bridge network 10 and the rejection of an undesired component thereof, without providing for enhanced response to changes in unbalance signal.

Resistor 52 is shorted out, putting capacitors 49 and 50 in parallel and connected to contacts 44 and 45 of transfer circuit 40'.

Starting from the position illustrated in Fig. 6, actuator 41 opens contact between fixed contact 42 and movable contact 43 on one branch and between fixed contact 45 and movable contact 46 on the other branch of the circuit, at a time when the undesired component of the bridge network's output is going through zero and capacitor 48 is charged to the voltage of the desired component. Upon closure of contacts 43—44, capacitor 48 shares its charge with capacitor 49—50. Since capacitor 49—50 had just been sharing charges with an oppositely charged capacitor 51, the charging current through transformer 31 upon closure of contacts 43—44 will be a heavy current. Upon closure of contacts 46—47, capacitor 51 is charged to the voltage of the next and oppositely polarized half of the voltage wave from bridge network 10. The time of opening of contacts 46—47 is controlled by actuator 41 to coincide with the zero value for the undesired component of this voltage.

Upon return to the position illustrated in Fig. 6, capacitor 51 will connect through contacts 45—46 to capacitor 49—50 and another powerful charging current will flow through transformer 31, but in the opposite direction since capacitors 48 and 51 share oppositely polarized charges with capacitor 49—50. Thus, an alternating-current signal is transferred by circuit 40', selected from the output of network 10 so as to eliminate the undesired component thereof.

Preferably as provided in Figs. 1 to 4, there is sampling of both the positive and negative half-waves of the output voltage of the measuring network 10, or equivalent, but, with some loss of sensitivity, sampling of either the negative or positive half-waves may be obtained with a simpler sampling-transfer device 20 or 40 having but a single set of contacts instead of two sets. As in the modifications previously described, the sampling effected by the contacts is so phased that it is centered at the zero of the undesired component of the signal voltage. Also, the measuring instrument can be a direct-current type, using the transfer device output as pulsating direct current.

A particular use of this invention is in connection with alternating-current bridge networks of Laurent and of Serner, wherein the scalar magnitude of an impedance is measured by varying a resistance to a like scalar magnitude. A development of the theory of such bridges is found on pages 481–483 of "Alternating Current Bridge Networks," by B. Hague, published in 1943 by Pitman and Sons, Ltd. There, it is to be noted that, at balance, scalar impedance magnitude equals scalar resistance magnitude independently of the phase angle of the impedance. With this invention used to suppress the undesired phase angle component of the bridge output, the determination of the scalar magnitude of the impedance may be made without recourse to the mutual inductance of Serner or of Laurent.

It shall be understood this invention is not limited to the specific arrangements illustrated and that other changes and modifications may also be made within the scope of the appended claims.

What is claimed is:

1. An alternating-current measurement system including a signal generating network energized at a single frequency and whose output voltage has desired and undesired components of that frequency and of different phase, measuring means including means normally responsive to both of said components, and means interposed in the signal-transmission circuit between said network and said responsive means substantially to eliminate the effect of one of said components upon said responsive means comprising a converter-inverter connected to provide at its interposition the sole path for transmission of said signals onward to said responsive means, said inverter-converter having contacts operating in fixed phase relation with the alternating-current output of said network and capacitors alternately connected by said phased contacts to sample the network output voltage at successive zeroes of said one of said components and to transmit the sampled voltage onward to said responsive means.

2. An alternating-current measurement system including a balanceable network energized at a single frequency and whose output voltage has in-phase and quadrature components, measuring means including means responsive to the desired one of said components and adversely affected by the other of said components, and inverter-converter means interposed in the signal-transmission circuit between said network and said responsive means to provide at its interposition the sole path for transmission of signals and phased substantially to eliminate effect of the other component upon said responsive means comprising a pair of capacitors, a pair of capacitance networks, and contacts operating synchronously with and in fixed phase relation to the alternating-current input to said balanceable network alternately to connect one and then the other of said pair of capacitors to sample the balanceable network's output at successive zeroes of the said other component and then to connect each capacitor to its respective capacitance network in the intervals between connections to the balanceable network to transmit voltages corresponding to the desired component of the balanceable network's output onward to said responsive means.

3. A self-balancing alternating-current measuring system including a balanceable network energized at a single frequency and whose output voltage has in-phase and quadrature components, rebalancing means responsive to one of said components and adversely affected by the other of said components, and inverter-converter means in circuit between said balanceable network and said rebalancing means substantially to eliminate overshooting of said rebalancing means including a pair of capacitor networks connected to said rebalancing means each of said networks having first and second capacitors, resistance means controlling current leakage between first capacitors of each capacitor network in avoidance of blocking under steady state unbalance of said balanceable network, and contacts operating synchronously with and in fixed phase relation to the alternating-current input to said balanceable network alternately to connect second capacitors of said capacitor networks to the balancing network first to sample the balanceable network output voltage and then to the respective first capacitor of each capacitor network to apply a fraction of said output voltage to said rebalancing means, said fraction being determined in part by the steady-state voltage-division ratio of said rebalancing means and said means in circuit between said balanceable network and said rebalancing means and in part by the transient-state, voltage-division ratio wherein said first capacitor of each capacitor network applies changes in said output voltage to said measuring means in a proportion other than said steady-state voltage-division ratio.

4. A self-balancing alternating-current measuring system comprising a balanceable network energized at a single frequency and whose output voltage has in-phase and quadrature components, rebalancing means including measuring means responsive to one of said components to balance said network and adversely affected by the other of said components, and transfer means in circuit between said network and said measuring means substantially to eliminate the effect of the quadrature component upon said measuring means and to reduce the tendency toward overshooting of said rebalancing means, said transfer means including contacts operating in synchronism with and in fixed phase relation to the alternating-current input to said network, a first pair of capacitors connected to said measuring means, resistance means controlling current leakage between said first pair of capacitors, and a second pair of capacitors alternately connected by said contacts to sample the network output voltage at successive zeroes of the quadrature component and to apply voltages corresponding to the in-phase component of the network output to said first pair of capacitors in part of the intervals between respective samplings of the network output voltage, said resistance means limiting the discharge rate of said first pair of capacitors in order to apply for a limited period changes in the network output voltage to said measuring means at a value greater than the voltage-division ratio between said measuring means and said transfer means.

5. A self-balancing alternating-current measuring system comprising a balanceable network energized at a single frequency and whose output voltage has in-phase and quadrature components, balancing means for said network including means responsive to both of said components, and transfer means interposed in the signal-transmission circuit between said network and said responsive means to provide at its interposition the sole path for transmission of signals and phased substantially to eliminate the effect of the quadrature component upon said balancing means and to minimize overshooting of said balancing means, said transfer means including contacts operating in synchronism with and in fixed phase relation to the alternating-current input to said network, a two-branch resistor-capacitor network, and capacitors alternately connected by said contacts to sample the network output voltage at successive zeroes of the quadrature component of said voltage and then to apply said sample of said network output voltage to respective branches of said resistor-capacitor network for transmission to said responsive means, whereby response to the quadrature component of the alternating-current signal is minimized and response to changes of the in-phase component is enhanced.

6. An alternating-current measurement system comprising a balanceable alternating-current bridge energized at a single frequency and whose output voltage has desired and undesired components, balancing means including means responsive to both of said components, and transfer means interposed in the signal-transmission circuit between said alternating-current bridge and said responsive means to provide at its interposition the sole path for transmission of signals, said transfer means including a two-branch resistor-capacitor network, a synchronous-contact rectifier, and a capacitor load for said synchronous-contact rectifier, the rectifier contacts being phased alternately to connect said capacitor load to sample the output voltage of said alternating-current bridge at successive zeroes of the undesired component and to connect said capacitor load to alternate branches of said resistor-capacitor network in part of the intervals between respective samplings of the output voltage, whereby the desired component is transmitted to the responsive means with its changes enhanced.

7. An alternating-current measurement system comprising a balanceable alternating-current bridge energized at a single frequency and whose output voltage has in-phase and quadrature components, balancing means including means responsive to both of said components, and transfer means interposed in the signal-transmission circuit between said alternating-current bridge and said responsive means to provide at its interposition the sole path for transmission of signals, said transfer means including a two-branch resistor-capacitor network, a balanced synchronous-contact rectifier having oppositely phased contacts, and a balanced capacitor load for said synchronous-contact rectifier, the rectifier contacts being phased alternately to connect the halves of said balanced capacitor load to sample the output voltage of said alternating-current bridge at successive zeroes of one of the said components and to connect the halves of said balanced capacitor load to alternate branches of said resistor-capacitor network in part of the intervals between respective samplings of the output voltage, whereby the other of said components is transmitted to the responsive means with its changes enhanced.

8. An alternating-current network having input and output terminals, measuring means having an input impedance connected to one of said output terminals, an electric actuator driven synchronously with the input to said network, a first pair of capacitors commonly connected to one end of the input impedance of said measuring means, a second pair of capacitors commonly connected to the other end of said input impedance and to one of said output terminals, two contacts driven by said actuator and fixedly connected respectively to said second pair of capacitors, said contacts each alternately connecting first to the other of said output terminals and then in the respective intervals between their connection to the other of said output terminals connecting to a corresponding one of said first pair of capacitors, said contacts being oppositely phased so that one contact connects to said other output terminal while the other contact connects to one of said first pair of capacitors, and resistance means in circuit with said first pair of capacitors.

9. An alternating-current network having input and output terminals, said network producing across its output terminals a voltage having differently phased components, measuring means having an input impedance connected to one of said output terminals, and means for transmitting only a desired one of said components to said measuring means comprising an electric actuator driven in fixed phase relation with the input to said network, a pair of capacitors commonly connected to said input impedance and to one of said output terminals, two contacts driven by said actuator and fixedly connected respectively to said pair of capacitors, said contacts being oppositely phased and each alternately connecting first to the other of said output terminals and then to said input impedance within the respective intervals between engagements with the other of said output terminals, and means for phasing said actuator for successive connection of said capacitors to said other of the output terminals when in successive half-waves of said voltage the undesired one of said components is substantially zero.

10. An alternating-current measuring system including a balanceable network energized at a single frequency and whose output voltage has in-phase and quadrature components, unbalance detecting means inherently responsive to both of said components, and means interposed in the transmission circuit between said network and said detecting means substantially to eliminate response of said detecting means to one of said voltage components comprising a converter-inverter having vibratory contact structure operating in fixed phase relation with the input to said network and reactive means alternately connected by said phased contact structure to sample said output voltage at zeroes of said one of its components and to transfer the voltage sample to said detecting means, said inverter-converter providing at its interposition the sole path for transmission onward to said responsive means.

11. An alternating-current measurement system comprising a balanceable alternating-current bridge energized at a single frequency and whose output voltage has desired and undesired components, balancing means including means responsive to the desired component and adversely affected by the undesired component, and transfer means interposed in the transmission circuit between said alternating-current bridge and said responsive means to provide the sole path for transmission onward to said responsive means, said transfer means including a two-contact capacitor circuit connected to said balancing means, a synchronous-contact rectifier, and a capacitor load for said synchronous-contact rectifier, the rectifier contacts being phased alternately first to sample the output voltage of said alternating-current bridge at successive zeroes of the undesired component and then to connect to alternate contacts of said capacitor circuit in part of the intervals between respective samplings of the output voltage, whereby the desired component is transmitted to the responsive means and the undesired component is suppressed.

12. An alternating-current measuring system for measuring alternating-current signals of desired phase in the presence of signals of undesired phase comprising a source of signals including both desired and undesired components of the same frequency and of different phase, measuring means responsive to signals of the desired phase and adversely affected by signals of undesired phase, and sampling means interposed in the signal-transmission circuit between said measuring means and said source substantially to eliminate the effect of said undesired component upon said measuring means comprising a pair of capacitive networks connected to said measuring means and contacts operating synchronously with and in fixed phase relation to said source to selectively connect to said capacitive networks signals representative of the magnitude of signals from said source when said undesired component is substantially at zero, said sampling means providing at its interposition the sole path for transmission of signals onward to said measuring means.

13. In an alternating-current system including a source producing a signal of single frequency and of variable amplitude having two components of different phase, means inherently responsive to both of said components and having an input impedance, and inverter-converter means interposed in circuit between said source and said responsive means and connected to provide at its interposition the sole path for transfer of signals, said inverter-converter means comprising networks including a pair of capacitors having a common terminal and individual terminals, contact structure alternately engaging said individual terminals in successive half-waves of said signal and phased to engage said terminals while one of said signal components is substantially zero, and connections including said contact structure providing that one of said capacitors is having the signal impressed thereon while the other is discharging and vice versa and providing for alternate connection of said capacitors in a signal transfer path including said input impedance to transfer only the other of said signal components to said input impedance.

14. An arrangement as in claim 13 in which each of said networks includes capacitance means shunted by resistance means providing a leakage path to prevent blocking of transmission of the desired component under steady state conditions of the signal.

15. An arrangement as in claim 13 in which said networks include capacitance and resistance means connected in series for partial discharge in prevention of blocking of transmission of the desired component under steady state conditions of the signal.

16. An arrangement as in claim 13 in which said networks include capacitance and resistance means momentarily connected in series during each cycle of operation of said contact structure for partial discharge in prevention of blocking of transmission of the desired component under steady state conditions of the signal.

17. An arrangement as in claim 13 in which each network includes first and second capacitors, said contact structure alternately connecting said first capacitors for aforesaid selective impression thereon of signals, said second capacitors being alternately connected by said contact structure to said first capacitors for transmission of the desired signal component to said responsive means and connected continuously in series with resistance means for partial discharge in prevention of blocking of transmission of the desired component under steady state conditions of the signal.

18. An arrangement as in claim 13 in which said contact structure comprises oppositely phased contacts respectively connecting a corresponding one of said capacitive networks alternately to an input terminal and to an output terminal of said inverter-converter.

References Cited in the file of this patent

UNITED STATES PATENTS

| Number | Name | Date |
|---|---|---|
| 2,297,543 | Eberhardt | Sept. 29, 1942 |
| 2,535,040 | Clark | Dec. 26, 1950 |
| 2,565,892 | Stanton | Aug. 28, 1951 |
| 2,584,954 | Williams | Feb. 5, 1952 |

FOREIGN PATENTS

| Number | Country | Date |
|---|---|---|
| 609,381 | Great Britain | Sept. 29, 1948 |